US011011929B2

(12) United States Patent
Nejatali et al.

(10) Patent No.: US 11,011,929 B2
(45) Date of Patent: *May 18, 2021

(54) WIRELESS POWER TRANSMISSION USING TRANSMITTERS OPERATING AT DIFFERENT FREQUENCIES

(71) Applicant: AENRGY INC., Trabuco Canyon, CA (US)

(72) Inventors: Saeed Nejatali, Trabuco Canyon, CA (US); Mohammad Javad Afshar, Trabuco Canyon, CA (US)

(73) Assignee: Aenrgy, Inc., Irvine, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 15/831,091

(22) Filed: Dec. 4, 2017

(65) Prior Publication Data

US 2019/0173314 A1 Jun. 6, 2019

(51) Int. Cl.
*H02J 50/05* (2016.01)
*H02J 50/40* (2016.01)
*H02J 7/02* (2016.01)
*H02J 50/12* (2016.01)

(52) U.S. Cl.
CPC ............ *H02J 50/05* (2016.02); *H02J 7/025* (2013.01); *H02J 50/12* (2016.02); *H02J 50/40* (2016.02)

(58) Field of Classification Search
CPC .. H02J 50/05; H02J 7/025; H02J 50/12; H02J 50/40
See application file for complete search history.

(56) References Cited

U.S. PATENT DOCUMENTS

| | | | |
|---|---|---|---|
| 9,059,598 B2 * | 6/2015 | Kang | H02J 7/00034 |
| 9,124,114 B2 * | 9/2015 | Haruyama | H02J 7/025 |
| 9,953,763 B2 * | 4/2018 | Uchida | H02J 5/005 |
| 9,973,031 B2 * | 5/2018 | Nejatali | H02J 50/10 |
| 10,250,072 B2 * | 4/2019 | Ng | H02J 5/005 |
| 2010/0210207 A1 * | 8/2010 | Goto | H04B 5/02 455/41.1 |
| 2015/0008736 A1 * | 1/2015 | Uchida | H02J 50/90 307/18 |
| 2015/0054344 A1 * | 2/2015 | Ng | H02J 7/025 307/104 |
| 2017/0018971 A1 * | 1/2017 | Oshima | H02J 50/12 |
| 2017/0201118 A1 * | 7/2017 | Nejatali | H02J 7/025 |

* cited by examiner

*Primary Examiner* — Jared Fureman
*Assistant Examiner* — Michael J Warmflash
(74) *Attorney, Agent, or Firm* — Fish IP Law, LLP (57) ABSTRACT

Systems and methods for orientation-independent, wireless charging of devices is provided. The methods disclosed herein comprise transmitters operating at different frequencies, which collectively generate a rotating magnetic field.

8 Claims, 8 Drawing Sheets

WIRELESS POWER TRANSMISSION USING TRANSMITTERS OPERATING AT DIFFERENT FREQUENCIES

FIELD OF THE INVENTION

The field of the invention is wireless transfer of power.

BACKGROUND

The background description includes information that may be useful in understanding the present invention. It is not an admission that any of the information provided herein is prior art or relevant to the presently claimed invention, or that any publication specifically or implicitly referenced is prior art.

There is a long-felt need to transmit power wirelessly. U.S. utility application Ser. No. 15/400,884 to the current inventors, details some of the prior art in this field, and teaches solutions that utilize orthogonally placed transmitters to transmit power to a receiving device independently of the relative orientation of the transmitters and the receiving device. The '884 application, and all other publications referenced herein, are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Orthogonal placement of the various transmitters tends to work well only when the transmitters are properly oriented, and only when there is synchronization of transmissions from the different transmitters. There are many instances in which satisfaction of those two conditions can be difficult. Thus, there is still a need for apparatus, systems, and methods, in which power can be transmitted independently of the orientation of the device, without requiring orthogonal orientation of transmitters, and without synchronization of transmissions from the different transmitters.

SUMMARY OF THE INVENTION

The inventive subject matter provides apparatus, systems, and methods in which transmitters operate at different frequencies to produce a rotating magnetic field, which is used to transmit power to a receiving device.

Where deviation of the respective frequencies emitted by the different transmitters is relatively small, preferably no more than 0.1% deviance from an arithmetic average, transmission of power can efficiently take place independently of the orientation of the device relative to the rotating magnetic field, and without requiring synchronization of transmissions from the different transmitters.

Preferred transmitters include a transmit antenna or coil, an oscillator, a transmitter impedance match circuit, and a driver that amplifies an alternating current, and transfers the amplified current to a transmitter impedance match circuit. The transmitter impedance match circuit is configured to match the impedance of an electric current amplified by the driver to the impedance of the transmit antenna or the transmit coil.

Preferred receivers include a receive antenna or coil, a receiver impedance match circuit, and a voltage regulator.

Tuning can be achieved in any suitable manner, but preferably using a variable capacitance controller (VCC). The VCC is used to determine (a) the resonant capacitance of two solid state variable capacitors associated with the receiver, and (b) a voltage associated with the resonant capacitance of the two solid state variable capacitors, and then modify the resonant capacitance to increase the transferred voltage or power. In the event that the measured voltage exceeds a threshold, the VCC adjusts the resonant capacitance of the receiver to avoid damage to the electronic components.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

The following description includes information that may be useful in understanding the present invention. It is not an admission that any of the information provided herein is prior art or relevant to the presently claimed invention, or that any publication specifically or implicitly referenced is prior art.

The term "user" is used herein to refer to a human who can use the wireless power transfer methods disclosed herein.

The terms "charge" or "charging" and "power transfer" or "transferring of power" are used interchangeably herein to refer to the transferring of electric power to an electronic or electrical device.

The terms "electric current" and "current" are used interchangeably herein to refer to an electric current that provides power to a device.

Energy is defined as power over time, and one can consider systems contemplated herein as transferring energy or power.

The terms "x-axis", "y-axis", and "z-axis" refer to all three dimensions of space within a charging space. The terms "x coordinate", "y coordinate" and "z coordinate" refer to vector coordinates in a three-dimensional space.

The terms "phase difference" or "phase shift" are used interchangeably herein to refer to the difference, expressed in degrees, between two or more signals or waves referenced to the same point in time.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Electromagnetic induction is mathematically described by the Maxwell-Faraday equation:

$$\nabla \times E = -\frac{\partial B}{\partial t}$$

$\nabla \times$ is the curl operator (i.e. a vector operator that describes the infinitesimal rotation of a vector field in three-dimensional Euclidian space), E(r,t) is the electric field, and B(r,t) is the magnetic field; both electric and magnetic fields are functions of a position r and a time t. The Maxwell-Faraday equation states that a time-varying magnetic field will always accompany a spatially-varying, non-conservative electric field, and vice versa. Furthermore, Faraday's Law of Induction states that a voltage is induced in a circuit whenever relative motion exists between a conductor and a magnetic field and that the magnitude of this voltage is proportional to the rate of change of the flux.

The inventive subject matter provides apparatus, systems, and methods for orientation-independent, wireless charging of a device.

Figure 1:
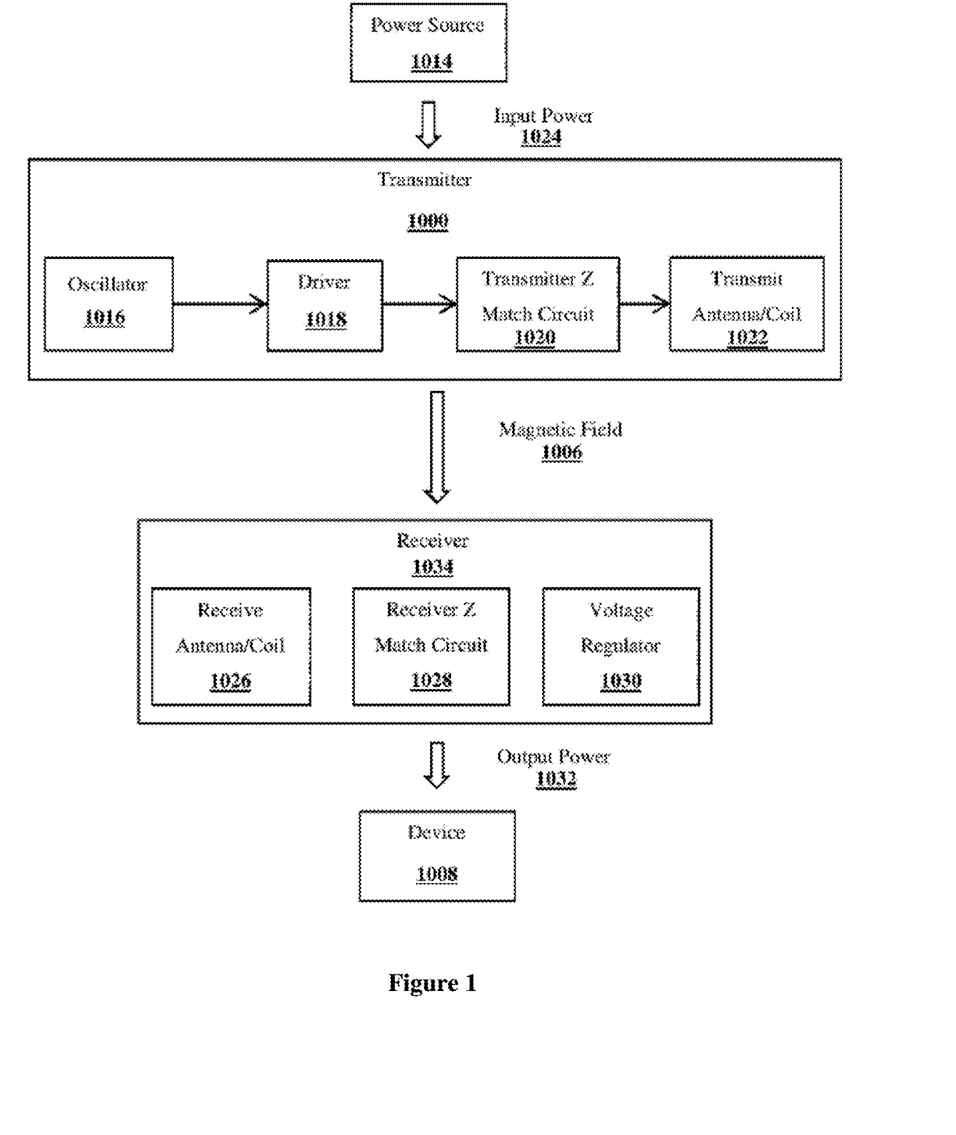
FIG. 1 is an exemplary flow chart illustrating wireless transfer of power as described herein.

In FIG. 1, a wireless power transfer system generally includes power source 1014, transmitter 1000, receiver 1034, and device 1008.

Power source 1014 provides input power 1024 to the wireless power transfer system. Input power 1024 provides a direct current (DC) to the system to enable transmitter 1000 to generate a signal or a wave comprising an amplitude and a frequency.

Transmitter 1000 comprises oscillator 1016, driver 1018, transmitter impedance (Z) match circuit 1020, and transmit antenna/coil 1022.

Oscillator 1016 is an electronic circuit that produces a periodic, oscillating electronic signal. In a preferred embodiment, oscillator 1016 converts input power 1024 provided by power source 1014 from a direct current to an alternating current, thereby generating a signal or a wave comprising an amplitude and a frequency. It is contemplated that a user can manipulate the settings of oscillator 1016 to modulate the frequency of the generated signal or wave. It is also contemplated that a user can modulate a phase difference or a phase shift between two or more signals by manipulating the setting of oscillator 1016. The signal generated by oscillator 1016 is generally weak, so driver 1018 is required to amplify the signal from oscillator 1016.

Driver 1018 amplifies the signal or wave that is generated by oscillator 1016. If the signal generated by oscillator 1016 is weak, driver 1018 increases the power of the signal or wave. It is contemplated that a user can modulate the amplitude of the signal or wave generated by oscillator 1016 by controlling the amplitude settings associated with driver 1018. Driver 1018 can also be a radio frequency power amplifier. For example, driver 1018 can be a class D or a class F radio frequency power amplifier.

Transmitter impedance (Z) match circuit 1020 matches the impedance of the signal produced by the driver 1018 with the impedance of the transmit antenna/coil 1022. By matching impedances, transmitter impedance (Z) match circuit 1020 can minimize signal reflection.

Transmit antenna/coil 1022 allows for any suitable means of power transfer. It is contemplated that transmit antenna/coil 1022 is an electrical conductor. In some embodiments, transmit antenna/coil 1022 comprises at least one wire in the shape of a coil, a helix, or a spiral. The transmit antenna/coil 1022 can comprise at least one insulated wire in the shape of a coil, a helix, or a spiral. The insulated wire may be insulated with non-conductive insulation, such as plastic or enamel. In some embodiments, transmit antenna/coil 1022 may comprise a wire with more than one winding. Transmit antenna/coil 1022 may comprise a coil having a magnetic core material. For example, the magnetic core material can comprise a material such as iron, laminated silicon steel, silicon-iron alloy, silicon-steel alloy, nickel-iron alloy, nickel-iron-molybdenum alloy, iron, copper, carbonyl iron, hydrogen-reduced iron, iron-boron-silicon alloy, and ferrite ceramics. In some embodiments, transmit antenna/coil 1022 can comprise at least one of a solenoid, a Helmholtz coil, a Maxwell coil, or a Halbach array.

Receiver 1034 comprises receive antenna/coil 1026, receiver impedance (Z) match circuit 1028, and voltage regulator 1030. Receiver 1034 provides wireless power to device 1008 by the current induced in receive antenna/coil 1026 by rotating magnetic field 1006. In a preferred embodiment, receiver 1034 provides wireless power to a battery coupled to device 1008. In an alternative embodiment, receiver 1034 provides wireless power to a device 1008 that is not powered by a battery. For example, receiver 1034 can provide wireless power to a wired device drawing power from a power outlet.

Figure 7:
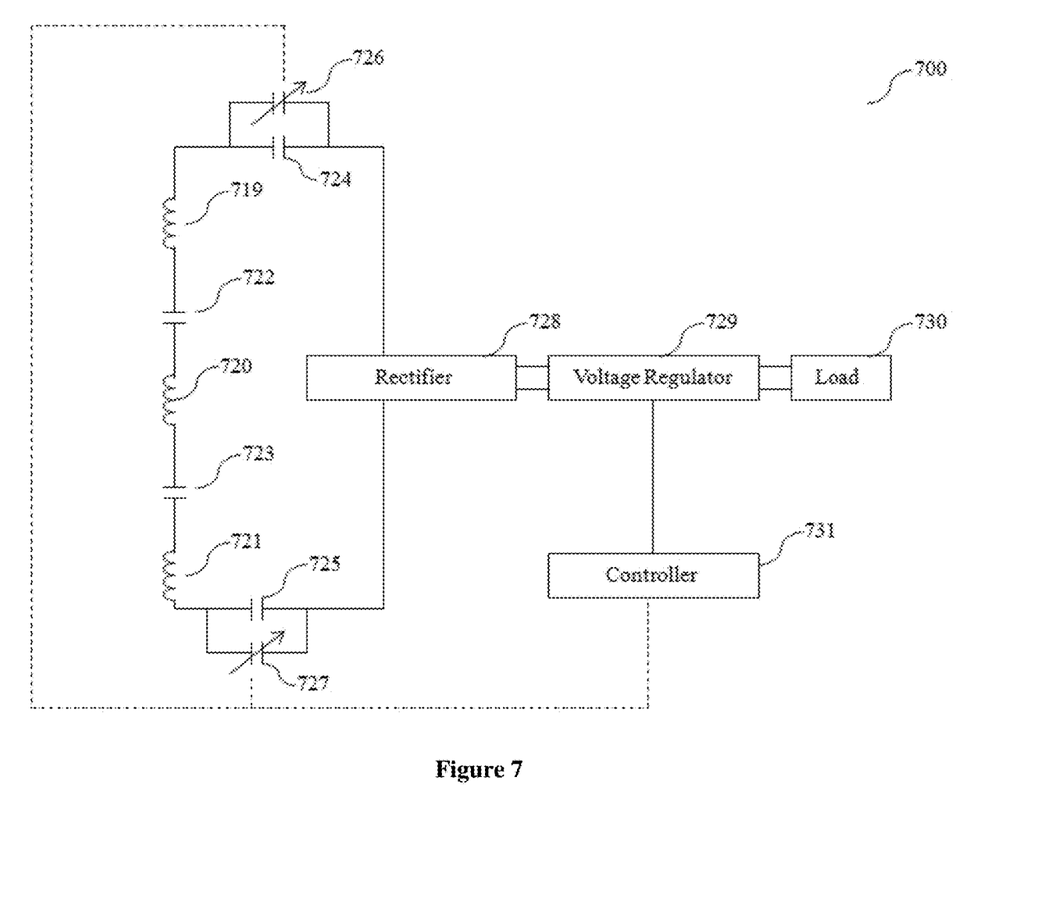
FIG. 7 is an schematic of an exemplary receiver system comprising coils and resonant capacitors to actively tune resonance of the receiver.

In a preferred embodiment, receiver 1034 uses active capacitance tuning, depicted in further detail in FIG. 7, to continuously accommodate dynamic changes in component values, the location of the receiver, and regulated voltage requirements to maximize wireless power transfer to device 1008. For example, active capacitance tuning can tune receiver 1034 to maximize the rectified voltage within the limits of voltage regulator 1030 or detune receiver 1034 to lower the rectified voltage under the limit of voltage regulator 1030. Active capacitance tuning of the resonant capacitance of receiver 1034 can be achieved in any suitable manner, but preferably using a variable capacitance controller (VCC). The VCC determines the current resonant capacitance of two solid state variable capacitors associated with the receiver, determines a voltage associated with the resonant capacitance of the two solid state variable capacitors, and then modifies the resonant capacitance to increase the transferred voltage or power. In the event that the measured voltage exceeds a threshold, the VCC adjusts the resonant capacitance of the receiver to avoid damage to the electronic components.

Receive antenna/coil 1026 delivers power through induced electric currents by rotating magnetic field 1006. Receive antenna/coil 1026 can comprise any suitable means of power transfer. In some embodiments, receive antenna/coil 1026 comprises at least one wire in the shape of a coil, a helix, or a spiral. The receive antenna/coil 1026 can comprise at least one insulated wire in the shape of a coil, a helix, or a spiral. The insulated wire can be insulated with non-conductive insulation, such as plastic or enamel. In some embodiments, receive antenna/coil 1026 comprises a wire with more than one winding. Receive antenna/coil 1026 can comprise a coil having a magnetic core material. For example, the magnetic core material can comprise a material such as iron, laminated silicon steel, silicon-iron alloy, silicon-steel alloy, nickel-iron alloy, nickel-iron-molybdenum alloy, iron, copper, carbonyl iron, hydrogen-reduced iron, iron-boron-silicon alloy, and ferrite ceramics. In some embodiments, receive antenna/coil 1026 can comprise at least one of a solenoid, a Helmholtz coil, a Maxwell coil, or a Halbach array.

Receiver impedance (Z) match circuit 1028 cancels out the reactive impedance of a signal generated by the receive antenna/coil 1026. Reactive impedance is commonly referred to as reactance, and forms the imaginary part of complex impedance, while resistance forms the real part of complex impedance. Receiver impedance (Z) match circuit 1028 is configured to match the impedance of an electric current amplified by the driver to the impedance of the transmit antenna or the transmit coil. In some embodiments, the receiver impedance (Z) match circuit 1028 removes the imaginary component of the impedance of the signal generated by the receive antenna/coil 1026. In preferred embodiments, the receiver impedance (Z) match circuit 1028 cancels out the reactive impedance of the signal generated by receive antenna/coil 1026 and, as a result, maximizes power transfer to device 1008. Canceling out the reactive impedance of the signal generated by the receive antenna/coil 1026 can also minimize signal reflection.

Voltage regulator 1030 regulates an electric current induced in receiver 1034 and provides a regulated electric current to the device 1008. By regulating the electric current, voltage regulator 1030 maintains a constant voltage and provides an electrified voltage to device 1008 in the form of output power 1032. Voltage regulator 1030 can be a coil-rotation AC voltage regulator, an electromechanical regulator, a pulse width modulated (PWM) AC voltage regulator, a ferroresonant transformer, a linear series regular, a switching regulator, and/or a silicon controlled rectifier regulator.

Magnetic field 1006, generated by the transmitters 1000, induces an electric current in receiver 1034. In preferred embodiments, the current induced in the receiver 1034 provides power wirelessly to the device 1008. The current induced in the receiver 1034 can provide power wirelessly to a battery coupled to device 1008. In some embodiments, the electric current is induced in the receiver 1034 through an air gap or through solid objects within a given charging space which provides power wirelessly to device 1008 within a given charging space. In some embodiments, the phase, the frequency, and the amplitude of the signals transmitted by transmitters 1000 are modulated to enhance the amount of power transferred wirelessly to a receiver 1034. In some embodiments, the phase, the frequency, and the amplitude of the signals transmitted by transmitters 1000 are modulated to increase a charging space in which power is transferred wirelessly to receiver 1034.

Figure 2:
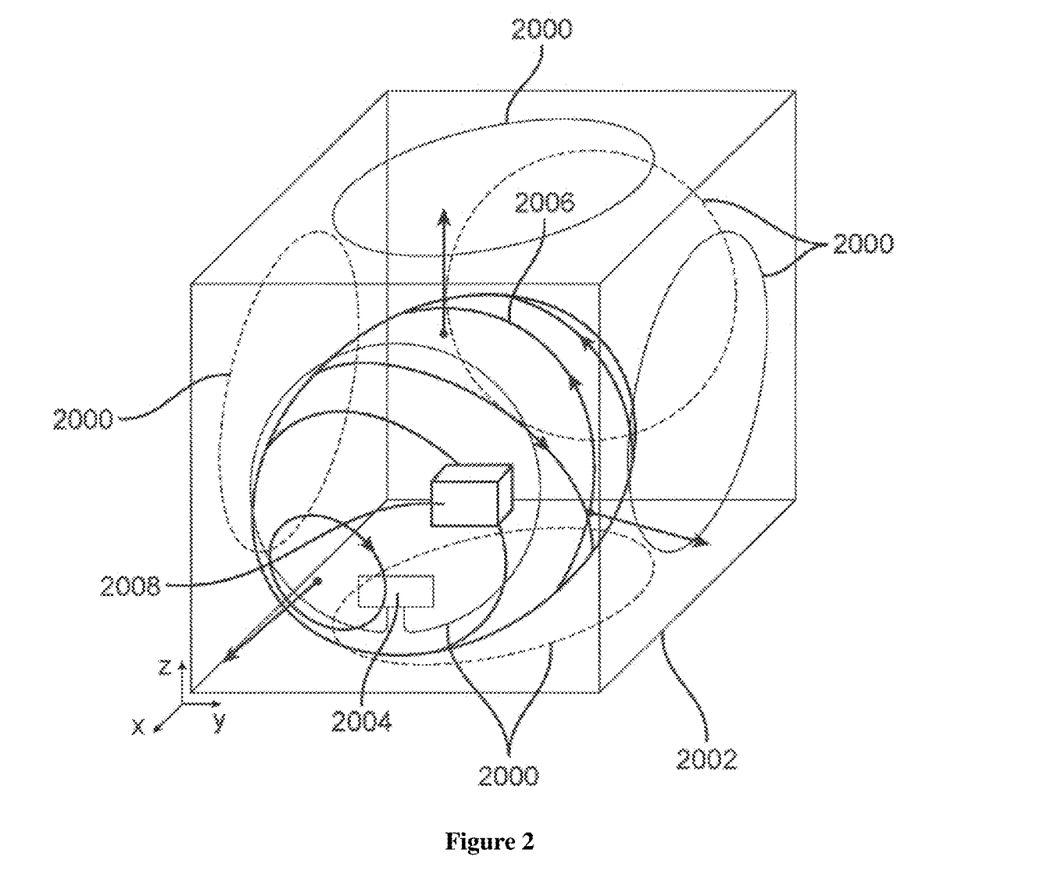
FIG. 2 is a perspective view of an exemplary embodiment of long distance charging, where six transmitters 2000 are placed within three axes of a charging space 2002.

In FIG. 2, an exemplary embodiment is shown of long distance wireless charging of a device 2008 using magnetic inductive coupling, wherein transmitters 2000, each having its own magnetic field 2006, are placed in six positions within three axes of a three-dimensional (3D) charging space 2002. Transmitters 2000 comprise electrical components 2004.

Transmitters 2000 each generate a magnetic field 2006. Transmitters 2000 can each be selectively engaged or disengaged. Further, each transmitter 2000 in a wireless charging system can be engaged concurrently, separately but synchronously, and concurrently with different signal frequencies. For example, transmitters 2000 may only activate when a receiver is in the charging space and requests power transfer. In some embodiments, transmitters 2000 and receiver 1034 can communicate with each other using in-band or out-of-band communication methods. In embodiments where transmitters 2000 and receiver 1034 communicate with each other using in-band or out-of-band communication methods, receiver 1034 can request wireless power transfer from transmitters 2000 using in-band or out-of-band communication.

Electrical components 2004 of transmitters 2000 comprise oscillator 1016, driver 1018, transmitter impedance (Z) match circuit 1020, and transmit antenna/coil 1022, as shown in FIG. 1. The combination of oscillator 1016 generating an amplified alternating current and driver 1018 energizing each transmit antenna/coil 1022 generates magnetic field 2006.

The amplified alternating current powers each of the transmitters 2000. In some embodiments, the amplified alternating current can be synchronized such that the output of signals by transmitters 2000 is also synchronized. The amplified alternating currents can also have the same frequency. Preferably, the amplified alternating currents have different frequencies. In other preferred embodiments, the amplified alternating currents cause transmitters 2000 to emit multiple signals, with each signal having a different frequency, and a phase that is shifted (producing a phase difference) from the other signals.

Amplified alternating currents can have the same amplitude. Alternatively, the amplified alternating currents can have different amplitudes. In some embodiments, the amplified alternating currents can have different amplitudes with a phase difference.

Transmitters 2000 can be placed in orientation that creates a rotating magnetic field. In some embodiment, transmitters 2000 can be placed on the same axis of space and kept at a phase difference of 0 degrees. As shown in FIG. 2, transmitters 2000 on the x-axis can be kept at a phase difference of 0 degrees by keeping some or all of transmitters 2000 on the same axis. Transmitters 2000 on the y-axis can also have a phase difference of 0 degrees. Transmitters 2000 on the z-axis can also have a phase difference of 0 degrees. Transmitters 2000 can be placed in a perpendicular orientation relative to each other. Alternatively, transmitters 2000 can be placed in a non-perpendicular orientation relative to each other. Transmitters 2000 each generate their own magnetic field(s) 2006. The vector sum of all magnetic fields generated by transmitters 2000 can create a rotating magnetic field which induces an electric current in receiver 1034 and enables wireless power transfer between transmitters 2000 and receiver(s) 1034.

The phase differences of the electric power source powering transmitters 2000 are controlled to achieve a desired magnetic field vector sum. The phase difference depends on the physical placement and angle between transmitters 2000 within charging space 2002. FIG. 2 depicts transmitters 2000 which have a phase difference of 90 degrees relative to each other transmitter 2000.

Rotating magnetic field 2006 is generated by transmitters 2000. In theory, placing the origin of the magnetic field vector sum at the center of charging space 2002 would produce a magnetic field 2006 in the shape of an ellipsoid. Depending on the placement of transmitters 2000 in charging space 2002, the shape of magnetic field 2006 can change in shape. The placement of transmitters 2000 can depend on the size of charging space 2002 and the shape of charging space 2002.

The phase difference of signals emitted by each transmitter 2000 can be synchronized so the magnetic field vector sum rotates in the shape of an ellipsoid each cycle. It is contemplated that the magnitude of magnetic field 2006 can be manipulated by calibrating the phase difference of each transmitter 2000 so the magnetic field vector sum is in the shape of a sphere each cycle. Synchronization between transmitters 200 can be achieved by assigning one transmitter 2000 as a master and the remaining transmitter(s) 2000 as slaves. To achieve synchronization, transmitters 2000 communicate through wired connections, wireless connections, or a combination of both wired and wireless connections. Synchronization can be phase synchronization, frequency synchronization, or a combination of phase and frequency synchronization of each signal transmitted by transmitters 2000.

In preferred embodiments, transmitters 2000 emit signals at different frequencies from each other according to a superimposition model. In a preferred superimposition model, the only coordination required between transmitters 2000 is that the signals emitted by transmitters 2000 run at different frequencies. Optimally, deviation of the respective frequencies emitted by the different transmitters is no more than 0.1%. For example, if the median frequency of the signals transmitted by transmitters 2000 is 6.78 MHz, then each transmitter 2000 can emit a signal with a frequency within 5 KHz of 6.78 MHz. A significant advantage of having transmitters emit signals at slightly different frequencies is that transmitters need not be orthogonally oriented to each other and need not be synchronized to create a rotating magnetic field because the differences in frequencies guarantee that the vector sum of the signals is not stationary in space. In another significant advantage over conventional wireless charging systems, transmitters that emit signals at different frequencies prevent the creation of stationary vector sums which would create a rotating magnetic field that is optimized for planes perpendicular to a vector with null spaces for planes parallel to the vector defined by the stationary vector sum. As a result, the present invention improves significantly over the prior art by enabling wireless charging in a three-dimensional space without creating dead zones and without requiring synchronization.

Figure 3:
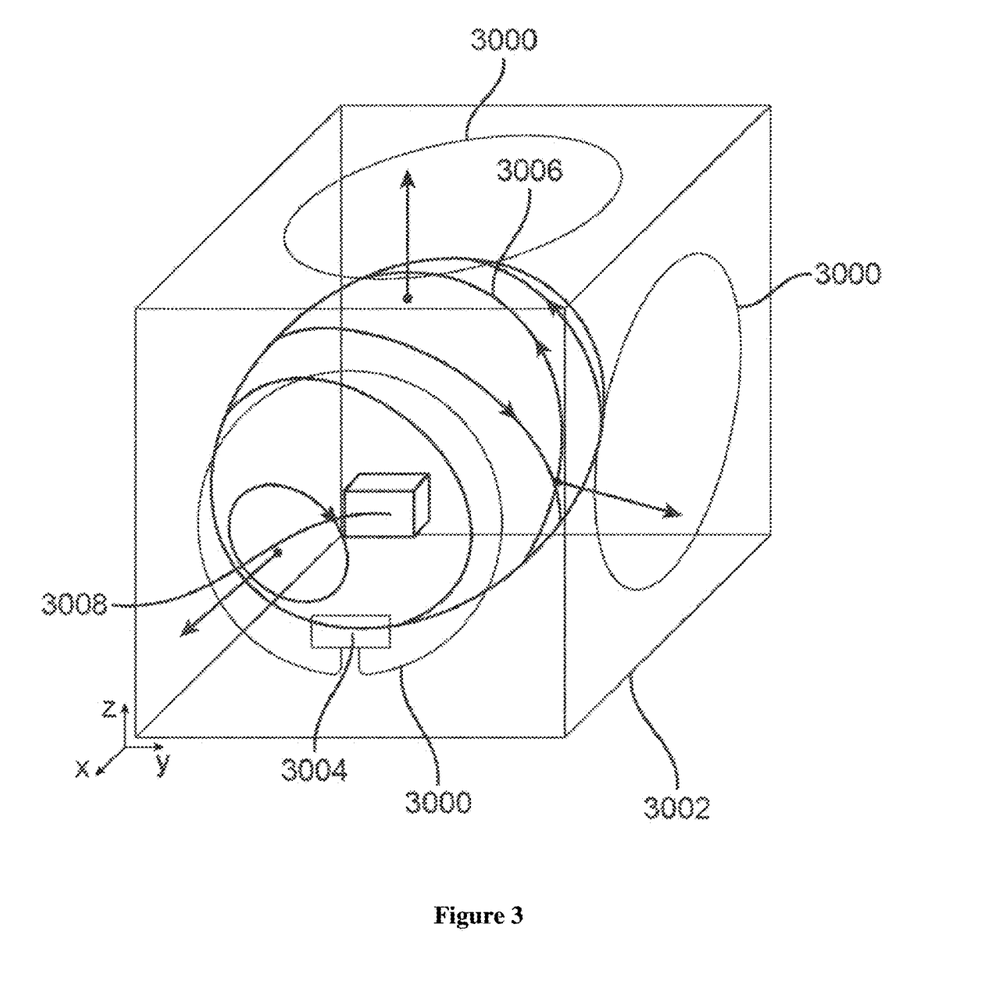
FIG. 3 is a perspective view of an exemplary embodiment of long distance charging, wherein three transmitters 3000 are places within three axes of a charging space 3002.

FIG. 3 depicts an exemplary embodiment of wireless power transfer where three transmitters 3000 each occupy the x-axis, y-axis, and z-axis, respectively. In the depicted embodiment, one transmitter 3000 is placed on each of the x-axis, y-axis, and z-axis. Preferably, each transmitter 3000 is configured to each transmit signals having different frequencies with the same amplitude. It is also contemplated that each transmitter 3000 can transmit a signal having different frequencies and different amplitudes. It is also contemplated that each transmitter 3000 can transmit a signal having a shared frequency and different amplitudes. In some embodiments, transmitters 3000 emit carrier frequencies.

Figure 4:
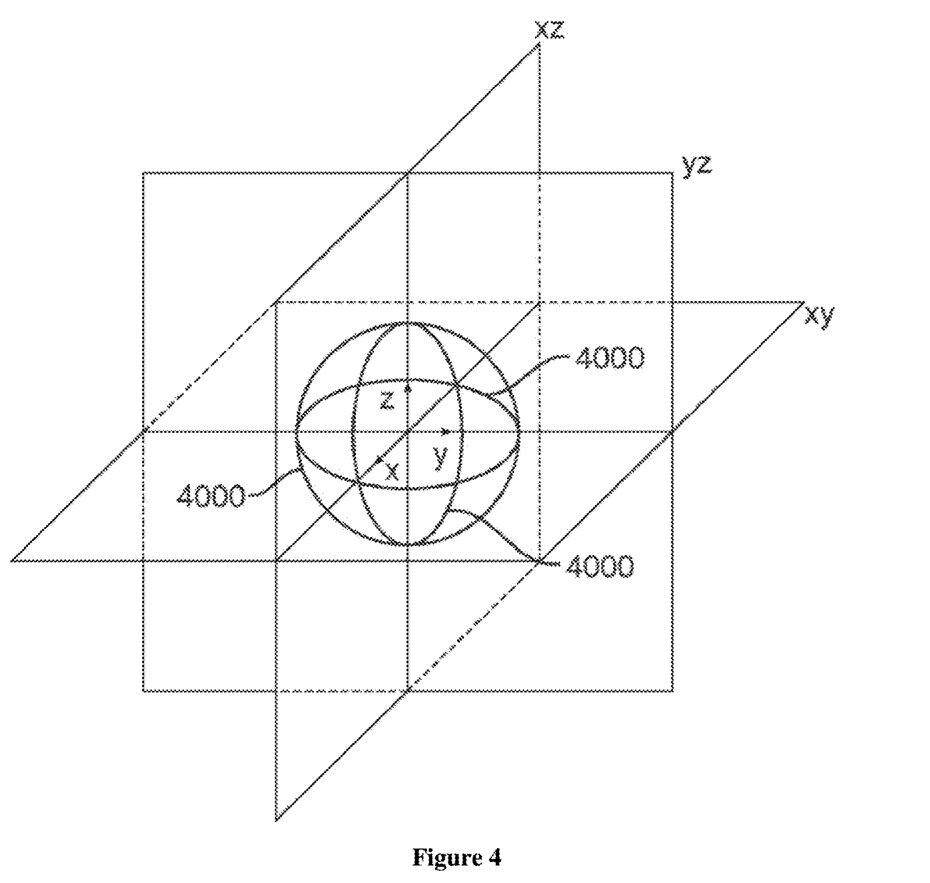
FIG. 4 is a perspective view of an exemplary embodiment of short distance charging, where three transmitters 4000 are places within three axes of a charging space.

FIG. 4 depicts an embodiment where three transmitters 4000 are positioned perpendicularly to each other. In an embodiment where transmitters 4000 are synchronized, the size of the charging space depends on the distance between each transmitter 4000. Lengthening the distance between transmitters 4000 creates a proportionally larger charging space, and shortening the distance between transmitters 4000 creates a proportionally smaller charging space. In preferred superimposition embodiments where transmitters 4000 are not synchronized, and emit signals with slightly different frequencies without amplitude modulation, the size of the useful charging space depends on the combination of different frequencies of transmitters 3000.

Figure 5:
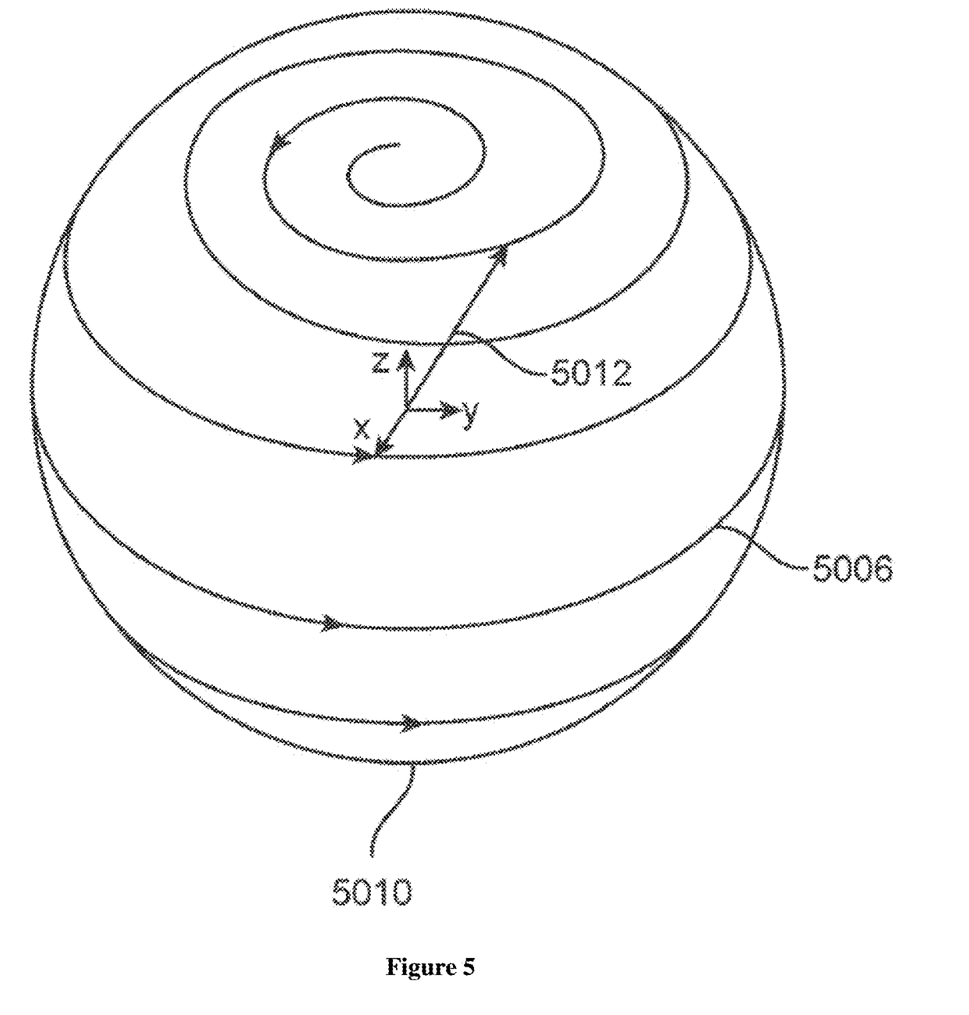
FIG. 5 is a conceptual view of (a) a rotating magnetic field 5006 and (b) a theoretical magnetic field vector sum 5012 at one moment in time and space.

FIG. 5 depicts a rotation magnetic field 5006 and a theoretical magnetic field vector sum 5012 at one moment in time and space. Each transmitter can generate its own magnetic field 5006. Magnetic field vector sum 5012 is the sum of all individual magnetic field vectors generated by each transmitter at any point in a physical space. Where multiple transmitters generate their own magnetic fields, the resulting magnetic field 5006 is defined by magnetic field vector sum 5012. In a preferred embodiment, the frequency of multiple magnetic fields 5006 is modulated to produce a magnetic field vector sum 5012 that rotates. In other embodiments, the phase, frequency, and amplitude of multiple magnetic fields 5006 are modulated to product a magnetic field vector sum 5012 that rotates. Magnetic field vector sum 5012 can embody any shape created by magnetic field vector sum 5012. In some embodiments, magnetic field 5006 can be in the shape of a sphere or an ellipsoid.

Figure 6:
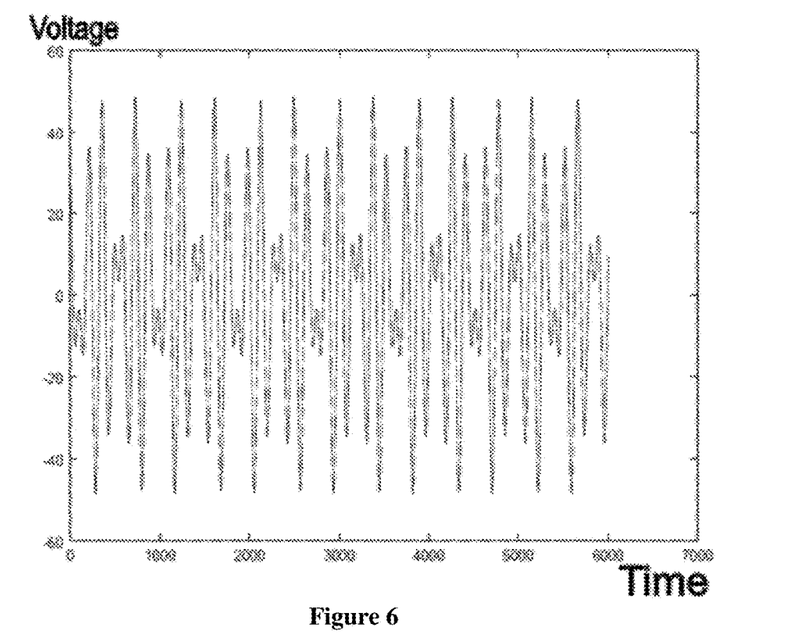
FIG. 6 is graph of a simulation of induced voltage waveforms for a case when three magnetic fields are produced, where the receiver was placed on a plane perpendicular to a vector at position (3, 4, and 5).

FIG. 6 depicts a simulation comprising the induced voltage waveforms of an embodiment where three transmitters generate three magnetic fields. The simulation assumes that the magnetic fields each have strengths that are independent of transmitter position with a charging space and that the receiver is placed on a plane perpendicular to a vector having an x, y, and z coordinate in the charging space.

FIG. 7 depicts a receiver system and distributed model of its coil and resonant capacitors. Receiver system 700 comprises rectifier 728, voltage regulator 729, load 730, controller 731, receiver coils 719, 720, and 721, resonant capacitors 722, 723, 724, and 725, and solid state variable capacitors 726 and 727.

Rectifier 728 is an electrical device that converts alternating current (AC) to direct current (DC) such that the current flows in only one direction. Voltage regulator 729 automatically maintains a constant voltage level based on the maximum voltage tolerated by an electronic device. Load 730 is an electrical component or portion of a circuit that consumes electricity generated by receiver system 700.

Controller 731 adjusts the capacitance of solid state variable capacitors 726 and 727. Preferably, controller 731 adjusts capacitance using a trial and error algorithm. For example, controller 731 can use a generate and test-based trial and error algorithm by increasing the capacitance of solid state variable capacitors 726 and 727. If the voltage increases, then controller 731 increases the capacitance by an amount. Controller continues to increase the capacitance of solid state variable capacitors 726 and 727 until it decreases. When the voltage decreases, then controller 731 decreases the capacitance by an amount where the maximum voltage was produced.

Solid state variable capacitors 726 and 727 are capacitors with mechanical and/or electronic mechanisms by which the capacitance of solid state variable capacitors 726 and 727 are changed. Solid state variable capacitors set the resonance frequency by matching the resonance frequency with a transmitted frequency or by impedance matching. Impedance matching is the practice of designing the input impedance of an electrical load or the output impedance of the corresponding signal source to maximize power transfer or minimize signal reflection from the load.

Figure 8A:
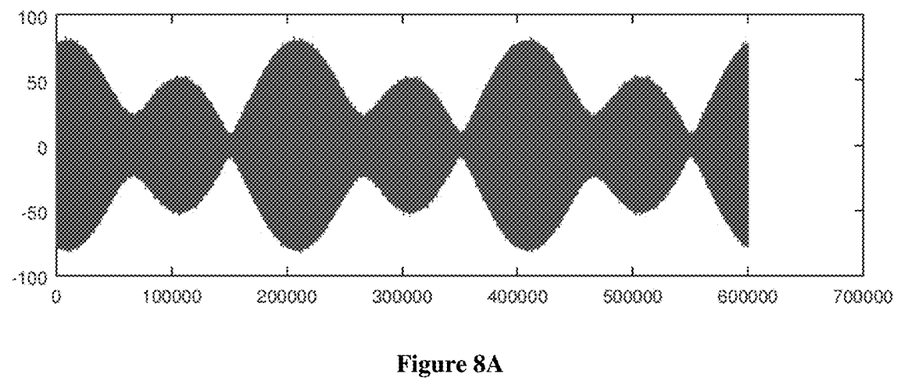
FIG. 8A is a graph of a first superimposition method waveform for a first receiver coil location, comprising a uniform magnetic field of amplitude 50 A/m, for 3 axes at a carrier frequency of 6.78 MHz with a 5 kHz frequency deviation.

FIG. 8A is a graph of a first superimposition method waveform for a first receiver coil location of an embodiment where three transmitters generate three magnetic fields using signals with the same amplitude (50 A/m) at a carrier frequency of 6.78 MHz with a 5 KHz overall frequency deviation. In the simulation, the position of a receiver 1034 is positioned perpendicularly to vector (3, 4, 5) with respect to an origin. The horizontal axis represents time in nanoseconds (ns) with 1 ns granularity. The vertical axis represents induced voltage measured in volts (V).

Figure 8B:
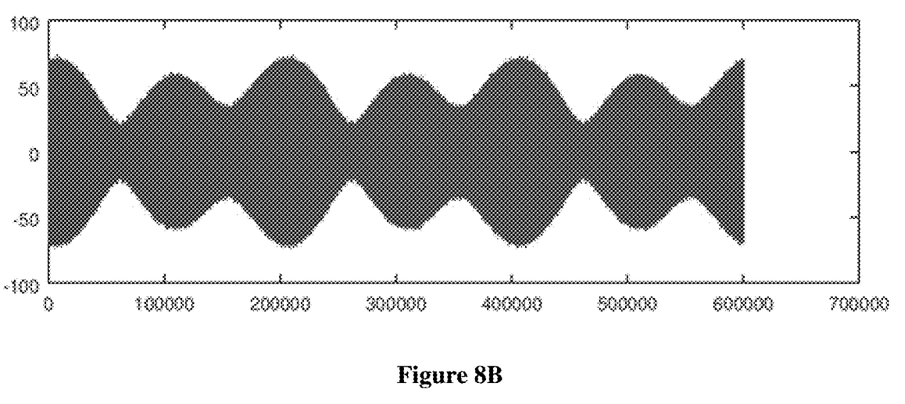
FIG. 8B is a graph of a superimposition method waveform for a second receiver coil location, different from the location in FIG. 8A, comprising a uniform magnetic field of amplitude 50 A/m, for 3 axes at a carrier frequency of 6.78 MHz with a 5 kHz frequency deviation.

FIG. 8B is a graph of a first superimposition method waveform for a first receiver coil location of an embodiment where three transmitters generate three magnetic fields using signals with the same amplitude (50 A/m) at a carrier frequency of 6.78 MHz with a 5 KHz overall frequency deviation. In the simulation, the position of receiver 1034 is positioned perpendicularly to vector (1, 5, 2) with respect to an origin. The horizontal axis represents time in nanoseconds (ns) with 1 ns granularity. The vertical axis represents induced voltage measured in volts (V).

As depicted the rectified average voltages for each of the receivers are 29.1V and 30.5V, respectively. The superimposition method induced voltage waveforms depicted in FIGS. 8A and 8B for each receiver demonstrate that the induced voltage is substantially independent of receiver coil orientation where three transmitters create a rotating magnetic field using a 5 KHz signal frequency deviation.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for orientation-independent, wireless charging of a device comprising:

generating a rotating magnetic field, within a three-dimensional charging space, by using a first transmitter configured to transmit a first signal having a first frequency and a first amplitude, a second transmitter configured to transmit a second signal having a second frequency and second amplitude, and a third transmitter configured to transmit a third signal having a third frequency and third amplitude, wherein the first frequency, the second frequency, and the third frequency are each a different frequency; and inducing, by the rotating magnetic field, an electric current in at least one receiver within the three-dimensional charging space, wherein the electric current that is induced in the receiver provides power wirelessly to the device, independent of an orientation of the device, relative to the rotating magnetic field.

2. The method of claim 1, wherein the first transmitter, the second transmitter, and the third transmitter are selected from a group consisting of: a transmit antenna, a transmit coil, an oscillator, a driver, and a transmitter impedance match circuit.

3. The method of claim 2, wherein the oscillator transforms a direct current into an alternating current and generates a signal comprising an amplitude and a frequency.

4. The method of claim 2, wherein the driver amplifies an alternating current and transfers it to the transmitter impedance match circuit.

5. The method of claim 2, wherein the transmitter impedance match circuit matches the impedance of an electric current amplified by the driver to the impedance of the transmit antenna or the transmit coil.

6. The method of claim 1, wherein the first transmitter, the second transmitter, and the third transmitter are installed on three axes associated with the three-dimensional charging space.

7. The method of claim 1, wherein the at least one receiver comprises components selected from a group consisting of: a receive antenna, a receive coil, a receiver impedance match circuit, and a voltage regulator.

8. The method of claim 1, wherein the respective frequencies emitted by the first transmitter, the second transmitter, and the third transmitter deviate from a carrier frequency.

\* \* \* \* \*